(12) United States Patent
Gaither et al.

(10) Patent No.: US 8,893,117 B2
(45) Date of Patent: Nov. 18, 2014

(54) INTERACTIVE PRODUCT IMPROVEMENT THROUGH THE USE OF VARIANTS AND DATA GATHERING REPORTS IN A SYSTEM THAT CAN BE UPDATED ON THE FLY

(75) Inventors: Shawn A. Gaither, Raleigh, NC (US); Randy Lee Swineford, Sunnyvale, CA (US)

(73) Assignee: Adobe Systems Incorporated, San Jose, CA (US)

(*) Notice: Subject to any disclaimer, the term of this patent is extended or adjusted under 35 U.S.C. 154(b) by 154 days.

(21) Appl. No.: 13/572,419

(22) Filed: Aug. 10, 2012

(65) Prior Publication Data
US 2014/0047433 A1 Feb. 13, 2014

(51) Int. Cl.
G06F 9/445 (2006.01)
G06F 9/44 (2006.01)
G06F 15/173 (2006.01)
G06F 21/00 (2013.01)
G06F 7/00 (2006.01)

(52) U.S. Cl.
USPC ............ 717/174; 717/100; 709/226; 705/59; 707/603

(58) Field of Classification Search
CPC ............. G06F 8/31; G06F 8/54; G06F 8/67; G06F 8/71; G06F 8/60; G06F 9/4411; G06F 9/44505
See application file for complete search history.

(56) References Cited

U.S. PATENT DOCUMENTS

| | | | |
|---|---|---|---|
| 8,078,571 B2 * | 12/2011 | Eagan et al. ................. | 707/603 |
| 8,533,336 B1 * | 9/2013 | Scheffler et al. ............ | 709/226 |
| 2002/0184610 A1 * | 12/2002 | Chong et al. ................. | 717/109 |
| 2005/0278258 A1 * | 12/2005 | O'Donnell et al. ........... | 705/59 |
| 2006/0161878 A1 * | 7/2006 | Koh et al. .................... | 717/100 |
| 2008/0320417 A1 * | 12/2008 | Begley et al. ................ | 715/822 |
| 2009/0106104 A1 * | 4/2009 | Upendran et al. ............ | 705/14 |
| 2009/0150458 A1 * | 6/2009 | Igarashi ....................... | 707/203 |
| 2009/0276770 A1 * | 11/2009 | Taieb et al. ................... | 717/177 |
| 2010/0011352 A1 * | 1/2010 | Chu et al. ..................... | 717/174 |
| 2010/0251084 A1 * | 9/2010 | Yoshida ....................... | 715/205 |
| 2010/0299763 A1 * | 11/2010 | Marcus et al. ................ | 726/30 |
| 2011/0321024 A1 * | 12/2011 | Knothe et al. ............... | 717/168 |

* cited by examiner

*Primary Examiner* — Don Wong
*Assistant Examiner* — Mohammad Kabir
(74) *Attorney, Agent, or Firm* — Kilpatrick Townsend & Stockton LLP

(57) ABSTRACT

Techniques for interactive product improvement through the use of variants and data gathering reports in a system that can be updated on the fly are disclosed. In some embodiments, interactive product improvement through the use of variants and data gathering reports in a system that can be updated on the fly includes processing a manifest to determine that a plug-in that includes a plurality of variants is available; randomly selecting a variant for the plug-in to automatically install on a device; and automatically installing the plug-in, in which the randomly selected variant is executed at run-time.

21 Claims, 6 Drawing Sheets

```
<?xml version="1.0" encoding="utf-8"?>
<manifest version="1.1" release="10.1.1" group="com.adobe"
updateRate="0" xmlns="http://ns.adobe.com/pdf/services/manifest/2012">
   <!-- Plug-ins -->
   <plugin id="com.adobe.acrobat.services.DEXEchoSign" group="com.adobe"
version="1.0">
     <download uri="DEXEchoSign.spi" algorithm="SHA256"
hash="18276bc11fa95ef24516fc0e2bab47c3a3b922a87f5a07a9673ebef717b3d3e8"
/>
     <install promptPane="BasicSharePane"/>
     <variant name="A" percentage = "25"/>
     <variant name="B" percentage = "25"/>
     <variant name="C" percentage = "25"/>
     <locale language="en_US" note="A new EchoSign plugin has been
installed"/>
   </plugin>
</manifest>
```

FIG. 3

INTERACTIVE PRODUCT IMPROVEMENT THROUGH THE USE OF VARIANTS AND DATA GATHERING REPORTS IN A SYSTEM THAT CAN BE UPDATED ON THE FLY

BACKGROUND OF THE INVENTION

In computing systems, a plug-in (e.g., or plugin) generally refers to a software component or set of software components that can add specific abilities to a software application. If supported, plug-ins can enable customizing the functionality of an application. Applications generally support plug-ins for various reasons.

Plug-ins can be used to enable third-party developers to, for example, create new features and/or functionality that extends an application; to support easily adding new features and/or functionality; to reduce the size of an application; and to separate source code from an application due to the incompatibility of software licenses.

For example, web browsers can use plug-ins to display new file types (e.g., Adobe® Flash® Player), graphics software can use plug-ins to support file formats and/or process images (e.g., Adobe® Photoshop®), and office productivity software can use plug-ins to extend the abilities of its application by adding custom commands and/or specialized features (e.g., Adobe® Acrobat®).

BRIEF DESCRIPTION OF THE DRAWINGS

Various embodiments of the invention are disclosed in the following detailed description and the accompanying drawings.

FIG. 2 is a diagram showing an embodiment of a SPA plug-in.

FIG. 3 is a diagram showing an embodiment of a manifest that includes variants.

DETAILED DESCRIPTION

Figure 1:
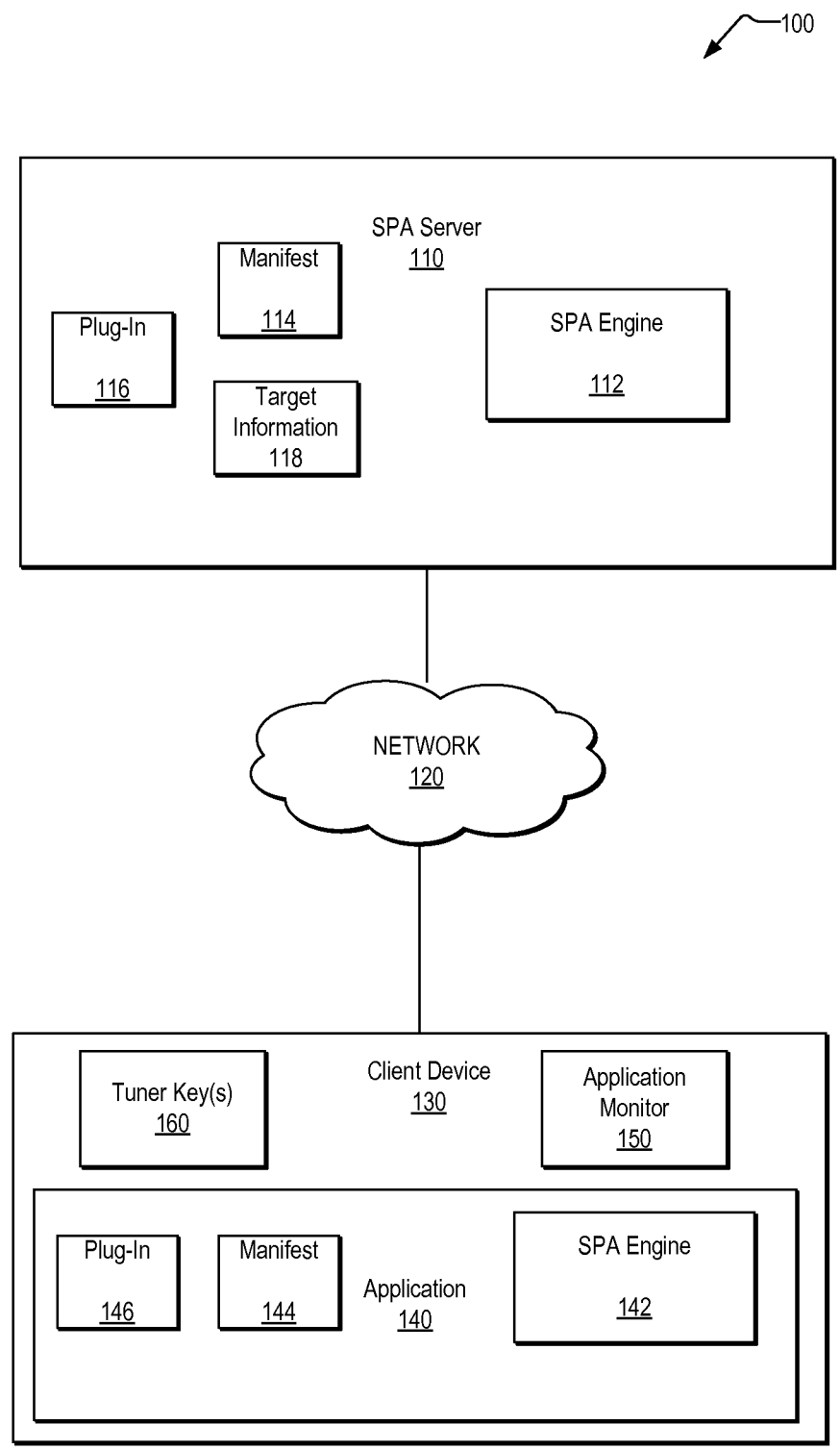
FIG. 1 is a functional diagram showing a platform for providing interactive product improvement through the use of variants and data gathering reports in a system that can be updated on the fly in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Software applications are continually being modified to provide product improvements, such as adding new and/or improved functionality (e.g., new features and/or user interface designs). User case studies are typically used to determine desirable new features for software applications. However, such user case studies are generally limited in numbers of users, limited in diversity of users, and/or such user case studies can be costly and time consuming.

What is needed are improved techniques for determining desirable product improvements for software applications. Accordingly, interactive product improvement through the use of variants and data gathering reports in a system that can be updated on the fly is provided in accordance with some embodiments.

In some embodiments, interactive product improvement through the use of variants and data gathering reports in a system that can be updated on the fly includes processing a manifest to determine that a plug-in that includes a plurality of variants is available (e.g., a plug-in that supports a plurality of variants that can be executed at run-time based on a selected variant); randomly selecting a variant for the plug-in to automatically install on a device (e.g., in which the randomly selected variant can be stored locally on the device, such as in a registry, and then can be used as a persistent configuration parameter to the plug-in for selecting the variant to be executed during run-time); and automatically installing the plug-in, in which the randomly selected variant is executed at run-time. In some embodiments, the randomly selected variant facilitates a feedback loop for providing interactive product improvement through a use of variants and data gathering reports in a system that can be updated on the fly.

In some embodiments, the manifest is modified to change a percentage allocation for the variant based on monitored user interactions with the plug-in. In some embodiments, the manifest is modified to change the variant as a default variant for the plug-in, in which the default variant is executed at run-time (e.g., based on processing of an updated manifest that includes parameters for forcing the selection of that variant, which is the default variant). In some embodiments, the randomly selected variant requires a license to execute. In some embodiments, the randomly selected variant requires a license to execute, in which additional payment is required to access the plug-in.

In some embodiments, interactive product improvement through the use of variants and data gathering reports in a system that can be updated on the fly further includes monitoring user activity that includes an interaction with the plug-in; generating a report based on monitored user activity that includes the interaction with the plug-in; and sending the report that includes the monitored interaction with the plug-in to a server.

In some embodiments, interactive product improvement through the use of variants and data gathering reports in a system that can be updated on the fly includes sending a manifest to a plurality of devices, in which the manifest identifies a plug-in that includes a plurality of variants that are available for the plug-in, in which the variants are randomly selected for each of the plurality of devices; and receiving a plurality of reports based on monitored user activity that includes an interaction with the plug-in for each of the plurality of devices. In some embodiments, interactive product improvement through the use of variants and data gathering reports in a system that can be updated on the fly further includes modifying the manifest to change a percentage allocation for each variant based on the monitored interactions with the plug-in. In some embodiments, interactive product improvement through the use of variants and data gathering reports in a system that can be updated on the fly further includes modifying the manifest to change one of the plurality of variants as a default variant for the plug-in, in which the default variant is executed at run-time.

In some embodiments, the variant mechanism techniques described herein with respect to various embodiments can provide for a feedback loop for testing user interactions with plug-ins that include variants. In some embodiments, variants are used to specify different run-time behaviors of a plug-in or its components for testing to provide for a feedback loop for testing user interactions with different variants of plug-ins (e.g., plug-ins can use different variants to test new features/functionality). For example, various different new user interface designs (e.g., new versus classic user interface designs) for a software application can be tested using these techniques. As another example, various new features and/or implementations of such new features can be tested using these techniques.

FIG. 1 is a functional diagram showing a platform for providing interactive product improvement through the use of variants and data gathering reports in a system that can be updated on the fly in accordance with some embodiments. In some embodiments, a platform (e.g., a Services Plug-in Architecture (SPA) platform) facilitates providing interactive product improvement through the use of variants and data gathering reports in a system that can be updated on the fly. In some embodiments, a platform (e.g., a Services Plug-in Architecture (SPA) platform) facilitates directing plug-in updates for a software application to a target audience using manifest parameters, if so desired.

Referring to FIG. 1, a platform 100 is shown that includes a SPA server 110. In some embodiments, the SPA server is a cloud service. In various embodiments, SPA server 110 is managed by a third party (e.g., Akamai) or is managed by the software company which produces the application 130 (e.g., Adobe in the case of Adobe® Acrobat®). For example, the SPA server can be a server controlled/maintained by a software application vendor (e.g., associated with application 140), or as another example, the SPA server can be provided by a third party content delivery server used by the software application vendor for such content delivery (e.g., an Akamai server or another third party content delivery server). As shown, the SPA server 110 includes a SPA engine 112, a manifest 114 (e.g., a SPA plug-in manifest, that can be implemented as an XML formatted file, or another format of data, that lists available SPA plug-ins and/or versions of SPA plug-ins), and a plug-in 116 (e.g., a SPA plug-in). In some embodiments, the SPA server 110 also includes target information 118. In some embodiments, the target information 118 is included within the manifest 114 (e.g., using manifest parameters). As also shown, a client device 130 is in network communication with the SPA server 110 via a network 120 (e.g., the Internet), and the client device 130 includes a software application 140 (e.g., Adobe® Acrobat® or another software application) that includes a SPA engine 142 (e.g., a SPA loader), a manifest 144 (e.g., an XML file or another formatted set of data, such as a signed XML list of SPA plug-ins, and, in some cases, multiple versions of plug-ins can be available, such as an initial version 1.0 may only support English only, and then a later version 1.1 may support English, French, German, and Spanish languages), and a plug-in 146.

For example, the client device 130 executes the application 140, in which the SPA engine 142 can periodically request a manifest. The SPA server 110 executes the SPA engine 112, and in response to the manifest request, sends the manifest 114 to the SPA engine 142. The SPA engine 142 processes the downloaded manifest 144 to determine which plug-ins (e.g., including, in some cases, which versions of a plug-in) to download and then install for use by the application 140 (e.g., the SPA engine 142 can determine which plug-ins/versions of plug-ins to download based on processing of the manifest 144 prior to downloading any new plug-ins, which can be performed as an asynchronous communication process). The SPA engine 142 can then request the selected new (versions of) plug-ins from the SPA server 110. In some embodiments, processing the manifest includes selecting a plug-in that includes variants using various techniques described herein (e.g., processing the manifest to determine a variant selection, storing the variant selection as a persistent configuration parameter for the plug-in, and using the variant selection when loading the plug-in to execute the selected variant at run-time). In some embodiments, processing the manifest includes selecting a plug-in (e.g., and possibly a particular version of a plug-in) based on targeting information included in the manifest (e.g., or separately stored target information provided by the SPA server 110) using various techniques described herein. In some embodiments, targeting information includes various parameters associated with the application 140 and/or the client device 130 (e.g., geography, locale, operating system platform version related information, application version related information, and/or other basic or advanced attributes, such as tuner keys, or other parameters, such as those described herein with respect to various embodiments). In some embodiments, targeting information includes tuner parameters (e.g., matching values of tuner keys, which are configuration settings that can be security stored and associated with the software application) using various techniques described herein. In some embodiments, both variants and targeting information are used for selecting which (if any) plug-ins/versions of plug-ins to install and which variants to execute at run-time for use by the application 140 using various techniques described herein.

In some embodiments, a new plug-in or new versions of a plug-in can require certain billing or licensing requirements. For example, if the application 140 does not have sufficient license/billing rights associated with the new plug-in or new version of the plug-in, then the SPA engine 142 can execute a user interface (UI) display (e.g., UI trigger) that provides an interface for prompting a user to provide any required license/billing related information and authorization (e.g., billing model, payment method(s), and authorization certificate(s)), as part of the process for downloading and installing that plug-in/plug-in version, which can also include secure interactions and verifications with the SPA server 110 or another billing/licensing service or cloud service for performing billing/licensing processing and authorizations).

In some embodiments, an application monitor 150 executes on the client device 130 to monitor a user's interaction with plug-ins installed for use with the application 140. In some embodiments, the application monitor 150 monitors activities (e.g., user interactions and/or application activities) with plug-ins (e.g., selected for install using variants) and generates reports for the platform (e.g., a Services Plug-In Architecture (SPA) platform) based on the monitored user interactions with plug-ins that facilitates providing interactive product improvement through the use of variants and data gathering reports in a system that can be updated on the fly. For example, the application monitor 150 can record mouse clicks, keyboard interactions, and/or touch screen interactions to monitor which features users are using, not using, and/or how the users are interacting with such features (e.g., features/functionality associated with plug-ins). As another example, the application monitor 150 can record observation of the application (e.g., as a whole), with filtering applied to all data to extract desired data regarding the plug-in of focus on a back-end server or cloud service function (e.g., to limit server communication from many clients), or in some cases, the filtering or some of the filtering can be performed locally on the client device. These techniques can be used to facilitate a software application product improvement program that can yield valuable information about how customers use and interact with such software application products, including plug-ins and different versions of plug-ins. The software application product improvement program can be implemented to be voluntary (e.g., users can be prompted to opt-in and/or be given an option to opt-out) and anonymous. In some scenarios, customers who elect to participate agree to share various information, including the following: system information, such as operating system, processor, and memory installed; browser type and version; certain software application product information, such as version number; plug-in information, such as version number; and software application feature usage information including plug-in/plug-in version usage information, such as menu options or buttons selected.

In some embodiments, the manifest 114 is processed on the SPA server 110 by the SPA engine 112 to determine which plug-ins/versions of plug-ins to select for downloading to the client device 130 for installation and use by the application 140. In some embodiments, the SPA server 110 requires that the SPA engine 142 send various information associated with the client device 130 and the application 140 to process the manifest 114 and, in some cases, the target information 118. For example, such information provided by the client device for such purposes can be provided in an XML file or another format of data including any parameters used for processing the manifest 114, such as client device 130 and application 140 related attributes, tuner key settings, and/or any other attributes or parameters. In some embodiments, whether to process the manifest locally on the client device 130 or on the SPA server 110 can be configured or determined dynamically (e.g., based on client processing resources, capabilities, and/or trust parameters, based on SPA server processing resources and/or network bandwidth, and/or various other parameters or considerations, such as for performance, bandwidth, work load balancing, and/or security considerations).

In some embodiments, the plug-in is installed on-the-fly without the user waiting or having to restart the application. In some embodiments, the plug-in is automatically installed, but the plug-in is executed only when the application is started. For example, if the plug-in is not yet downloaded and installed when the application is started, then the plug-in is not executed until the next time the application is started (e.g., this approach can ensure that the user interface is consistent for the application throughout a given session, and avoids a user experience in which a user may be surprised by a user interface changing during that session).

In various embodiments, steps are performed in any order. For example, new plug-ins may be periodically detected and obtained from SPA server 110, and the plug-in 116/146 may have been downloaded before processing the manifest 144 to determine whether or not to install the plug-in 146.

In some embodiments, plug-ins perform a variety of services and functions that are not necessarily provided by the underlying application (e.g., Adobe® Acrobat® or another application) and in at least some cases can only be obtained by installing the plug-in. For example, an electronic signature plug-in can be provided to extend an office productivity software application, such as Adobe® Acrobat®. The variant mechanism described herein with respect to various embodiments can be used to test providing the electronic signature plug-in as a for-purchase plug-in version and as a free trial plug-in version (e.g., free for a certain period of time before purchase is required for continued use). The customer interactions with these variants can be monitored to determine which option is more likely to generate more revenue (e.g., whether there will be more purchases of the new plug-in by users if there is a free trial period or not). Based on the feedback learned using the variant mechanism for this example plug-in scenario, the manifest can be modified to change the variants (e.g., adjust variant allocations, such as percentages associated with different variants of the plug-in) or, in some cases, simply choose one of the variants as the default or only variant of the plug-in to execute at run-time (e.g., or as another example, a few number of variants may be used to perform further testing on a subset of the variants as a form of a run-off between such variants, such as to obtain a wider metric for those variants before determining whether or not to select one or any of those variants for the application). For example, if the for-purchase only option is more successful based on such variant based testing and automatic feedback loop (e.g., generates more revenue and/or yields a greater number of purchases of the plug-in), then the manifest can be modified to only provide that variant of the plug-in (e.g., the trial period variant is not included in the manifest). The electronic signature plug-in is merely exemplary and plug-ins are not necessarily so limited. As will now be apparent to one of ordinary skill in the art in view of the various embodiments described herein, the variant mechanism techniques can be used to provide plug-ins that include a plurality variants and can be used to automatically adjust variant settings based on monitored feedback using the various techniques described herein with respect to various embodiments (e.g., without necessarily having to re-download the plug-in, as the variant settings can be adjusted to cause different variants to be performed at run-time for that plug-in, in which the variants are adjusted using, for example, manifest parameters that can be changed in a new version of a manifest, which can be downloaded and processed to cause the stored value(s) of the variant selection to be modified on a given client device(s)).

In various embodiments, a plug-in is able to access cloud-based services, includes a sophisticated user interface experience (e.g., panels and calculations), can be easily created, and/or can interact with native user interface elements (e.g., user interface controls and/or services that are native to Adobe® Acrobat® as opposed to the plug-in). In various embodiments, an out-of-update of a plug-in is supported (e.g., detection, distribution, and/or execution of a plug-in is not dependent a version update of the software application for which the plug-in is provided, such as Adobe® Acrobat®, and in some cases, such can be installed on-the-fly, such as when the software application is currently being executed), a plug-in has access to Access to the JavaScript Document Object Model (DOM) Application Programming Interfaces (APIs), and/or a plug-in is able to provide bidirectional communication.

In addition to being able to facilitate interactive product improvement through the use of variants and data gathering reports in a system that can be updated on the fly, the platform 100 can also facilitate directing plug-in updates for a software application to a target audience using manifest parameters, if so desired. In some embodiments, plug-ins are targeted based on attributes associated with the client device, such as basic attributes (e.g., version, platform, etc.) as well as advanced attributes (e.g., variants, tuner keys, etc.). For example, if a brand new plug-in is only available to Chinese language versions of the software application, then the plug-in can be targeted to such Chinese users using manifest parameters (e.g., language version, geography, and/or locale parameters). Using target information (if desired), plug-ins may be targeted to Chinese users (e.g., or users meeting some other criteria).

In some embodiments, plug-ins are targeted based on attributes associated with the client device, including advanced attributes, such as tuner keys. In some embodiments, tuner keys 160 are configuration settings that are stored on the client device as shown in FIG. 1 (e.g., tuner keys can be stored as registry key related information securely stored and associated with the application 140). For example, tuner keys can be used for enterprise customers of the software application 140 to control a common configuration environment for each of the client devices managed by a particular enterprise (e.g., in which a system administrator can control which plug-ins/versions of plug-ins can be installed/loaded in order to maintain a common client device computing environment, including using such tuner keys for selecting which versions and plug-in extensions can be installed/loaded for the software applications on the client device).

The various techniques described herein with respect to various embodiments for targeting plug-ins based on attributes associated with the client device, such as basic attributes and advanced attributes, provide for a more flexible and targeted mechanism for distribution and installation of plug-ins. Another benefit is the reduced amount of network traffic, which reduces networking related costs. Other criteria by which plug-ins are targeted may be employed; some other examples are described in further detail below.

Figure 2:
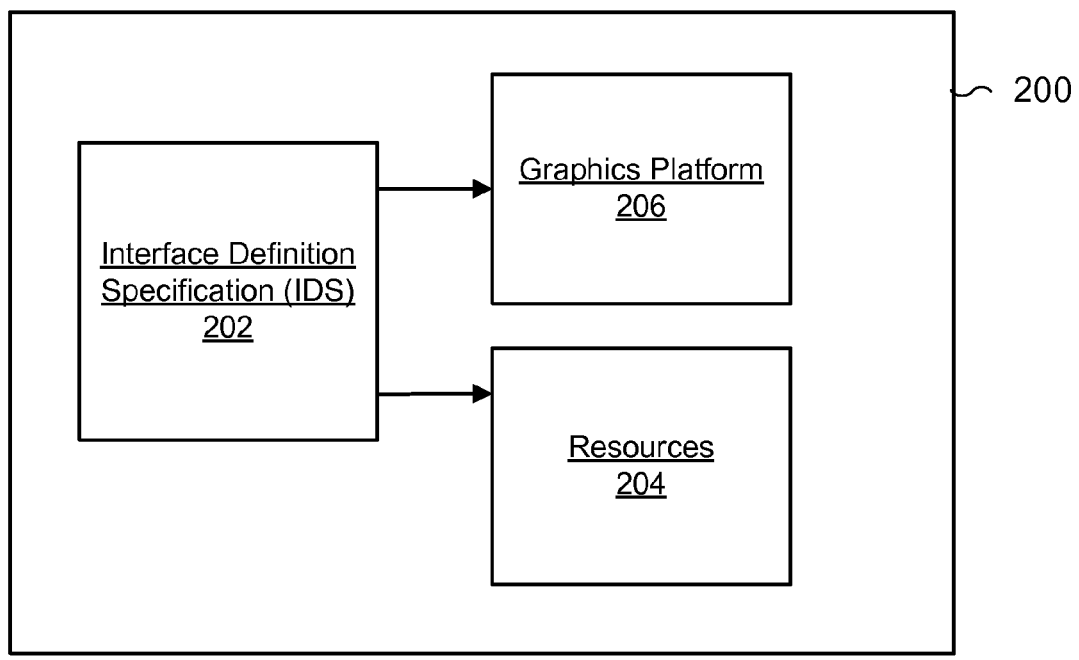

FIG. 2 is a diagram showing an embodiment of a SPA plug-in. In some embodiments, interfaces, services, and/or functions exposed by SPA plug-in 200 can be used to update an application user interface to display a user interface control and/or any other functionality associated with the plug-in. For example, an electronic signature plug-in associated with a user interface and/or various other product improvements can be implemented using the various techniques described herein. In some embodiments, a plug-in includes other components in addition to those described herein.

Referring to FIG. 2, SPA plug-in 200 includes interface definition specification (IDS) 202. In general, IDS 202 includes metadata describing the SPA plug-in, including (but not limited to) the contents of a SPA plug-in wrapper or package (e.g., SPA plug-in 200). In various embodiments, IDS 202 includes the following: identifying attributes of the SPA plug-in (e.g., a unique identifier (ID) and a version number to uniquely identify the plug-in and its version, and in some cases, a group attribute that can be used, for example, to identify plug-ins authored by the same vendor), user interface elements of the SPA plug-in to be displayed via an application user interface (e.g., panels, menu items, buttons, etc.), actions performed by the SPA plug-in via an application user interface (e.g., new panes, logging, events, or pop-ups not native to the application), references to resources used or called by the SPA plug-in (e.g., access strings, icons, databases, or storage), etc. In some embodiments, IDS 202 includes metadata about resources 204 and/or actions 206.

In this particular example, IDS 202 includes references to resources 204 and actions 206, which are also components of SPA plug-in 200. Resources 204 include resources called by or used by an SPA plug-in and a variety of items, such as icons, strings, data files, and/or accessible storage or devices. In some embodiments, resources 204 include common resources (e.g., which are available or used globally) and localized resources (e.g., for use in specific locales).

Graphics platform 206 is used to draw (e.g., buttons, checkboxes and other user interface controls) to an application user interface. In some embodiments, graphics platform 206 is a SWF (Shockwave Flash) file. A SWF supports all three key concepts of a Model-View-Controller (MVC) model and is an example of a compiled, self-contained, platform-independent graphics platform. At least in the case of SWF files, the model is handled via the logic which is available to a SWF via the underlying ActionScript code which is compiled into the SWF. ActionScript and SWFs, compared to some other MVC models, may be attractive, because the MVC model is platform-independent (e.g., like Java). Some other user interface platforms are platform-specific (e.g. XCode for iOS is specific to Apple platforms). However, whatever the platform, they all typically support some form of graphical interface builder IDE (e.g. the Adobe Flash/Flex Builder) along with a programming language interface (e.g. ActionScript), and via some form of compiler spit out an executable of some form (e.g. a SWF file).

In some embodiments, a plug-in (e.g., a SPA plug-in) is a software module created to extend the capabilities of a software application (e.g., Adobe® Acrobat® or another software application). In some embodiments, a plug-in is packaged as a container file (e.g., a Universal Container Format (UCF) file). In some embodiments, the plug-in also includes a digital signature for certification.

In some embodiments, variant names and percentages are used to allocate different variants of a plug-in with a degree of randomness such that different client devices may be configured to execute (e.g., at load time/run-time) different variants of the plug-in to facilitate interactive product improvement through the use of variants and data gathering reports in a system that can be updated on the fly. The following figure shows an example of variant names and percentages.

FIG. 3 is a diagram showing an embodiment of a manifest that includes variants. In some embodiments, variants (e.g., implemented as shown) are located in the manifest 114 and/or in target information 118 on the SPA server as shown in FIG. 1. In this particular example, a manifest (e.g., manifest 114 on SPA server 110 as shown in FIG. 1) lists a plug-in that includes variants. In some embodiments, variants include other elements in addition to or as an alternative to those described herein.

Referring to FIG. 3, SPA manifest 300 includes variant information 302. In this example, three variants are defined: variant A with a percentage or probability of 25%, variant B with a percentage or probability of 25%, and variant C with a percentage or probability of 25%. Although three variants are shown in this example, any number of variants may be used (e.g., just variant A, or another form of identification label, such as A1, B12, Car, B5g67, etc.) and different allocations (e.g., percentages) may be used for each of the variants. A number in the range [1, 100] (i.e., inclusive of 1 and 100) is selected. If the randomly-selected number is in the range of [1, 25] then variant A (i.e., the first variant encountered when parsing variant information 302) is used, if the randomly-selected number is in the range of [26, 50] then variant B (i.e., the second variant encountered when parsing variant information 302) is used, and if the randomly-selected number is in the range of [51, 75] then variant C is used. If the randomly-selected number is greater than or equal to 76 then the plug-in is not updated. Each of the variants may be associated with a different aspect of the plug-in, including the plug-in itself. Note that variants are applicable to panes, panels, menu items, buttons, links, text actions, and even as ActionScript conditionals. In general, variants allow for complete modification of the plug-in in any way, shape, or form desired.

Variants may be used to test different functionality/features of plug-ins for a variety of applications. For example, a new plug-in that includes a plurality of variants may be provided, and a company may want to determine the most effective variant of the new plug-in, such as based on user interaction. In one example of how variants are used, 5% of users are presented with a first variant of the plug-in, 5% of users are presented with a second variant of the plug-in, and the remaining 90% of users are ignored (i.e., they are not part of the product improvement testing for the different variants of this new plug-in). By observing the interactions of the users presented with the first and second variants of the plug-in (e.g., using Adobe® Headlights or another programmatic tool for monitoring user interactions with a software application that is configured to execute different variants of the plug-in at run-time), the most effective variant of the new plug-in can be determined to facilitate product improvement for the software application. Using variants, trial features/functionality of a new plug-in may be tested on a portion of the user base before being released on a wider scale.

In some embodiments, variants are combined with other target information so that a particular variant of a plug-in is only presented to a number of users (e.g., a subset of randomly selected users or all users based on the variant(s)), devices, or configurations (e.g., attributes) which meet certain criteria based on the target information. For example, a version of a plug-in can be delivered to a certain percentage of non-enterprise users; enterprise users in that example would not be presented with the plug-in (e.g., which can be targeted to not receive the plug-in based on tuner key settings/values). Another example is a new plug-in that is English-only (e.g., because there was not enough time to localize the plug-in). At a later point, a revision comes along that contains tier one locales (e.g., French, German, Spanish), followed by tier two (Chinese, Japanese, Korean), etc. As another example, such targeting techniques can be used to target variant selection for certain users, devices, and/or other criteria (e.g., MAC OS users in the United States can be configured to select variant A of a new plug-in, and Microsoft Windows users in the United States can be configured to select variant B of the new plug-in, and all other users can be configured to select variant C of the new plug-in).

In some embodiments, a plug-in or a particular version of the plug-in is delivered to enterprise users based on a tuner key (e.g., setting(s) of tuner key(s) can be used to determine whether or not the plug-in is installed for the enterprise user's software application).

In some embodiments, a decision whether to install a plug-in or a particular version of the plug-in (e.g., which includes a random factor) is made each time an application is started. For example, if a message is to be presented to 5% of users, each time a user starts the application, then that user has a 5% chance of viewing the message. In such embodiments, just because a user is presented with the message one time does not necessarily mean that that user will see the message again the next time that the user runs that application.

Below is an example manifest schema that lists available SPA plug-ins that can be downloaded from a SPA server. As shown below, the manifest schema supports variants and also supports attributes and tuner keys for targeting delivery of plug-ins.

---

Manifest Schema for Available SPA plug - ins on Server

---

```
namespace xsd="http://www.w3.org/2001/XMLSchema-datatypes
default namespace pdf="http://ns.adobe.com/pdf/services/manifest/2011"
grammar {
start =
element manifest {manifestContent}
manifestContent =
attribute version {versionString} &
attribute release {versionString} ? &
attribute group {uidString} ? &
attribute updateRate xsd:positiveInteger ? &
attribute updateWait xsd:positiveInteger ? &
element config {configContent} *
element plugin {pluginContent} *
pluginContent =
attribute id {uidString} &
attribute group {uidString} ? &
attribute requires {versionString} ? &
{ configContent }
configContent =
attribute version {versionString} &
attribute release {versionString} ? &
attribute {tunerKey} {tunerList} ? &
attribute startDate {xsd:date} ? &
attribute revertDate {xsd:date} ? &
element configuration {configurationContent} * &
```

| Manifest Schema for Available SPA plug - ins on Server |
|---|
| element download {downloadContent} &<br>element install {installContent} ? &<br>element variant {variantContent} * &<br>element locale {localeContent} *<br>uidString =<br>xsd:token {pattern="[a-zA-Z0-9_\.]*"}<br>nameString =<br>xsd:token {pattern="[a-zA-Z0-9_]*"}<br>versionString =<br>xsd:token {pattern="[0-9]+(\.[0-9]+){0-3}*"}<br>configurationContent =<br>attribute platform {xsd:token = "Windows" | "OSX"} ? &<br>attribute product {xsd:token = "Reader" | "Standard" | "Pro"} ?<br>downloadContent =<br>attribute protocol {xsd:token = "http" | "https"} ? &<br>attribute uri xsd:anyURI<br>attribute algorithm {xsd:token = "SHA1" | "SHA256" | "SHA512" | "RIPEMD160"} &<br>attribute hash {xsd:token {pattern="[0-9a-fA-F]*"}} &<br>attribute excludePromptInstall {xsd:token = "yes" | "no"} ?<br>installContent =<br>attribute requiresPrompt {xsd:token = "yes" | "no"} ? &<br>attribute promptPane {uidString} ? &<br>attribute immediate {xsd:token = "yes" | "no"} ? &<br>attribute priority {priorityContent} ?<br>priorityContent =<br>xsd:token = "required" | "recommended" | "optional" | "testing"<br>variantContent =<br>attribute name {nameString} &<br>attribute percentage xsd:positiveInteger<br>tunerKey =<br>xsd:token {pattern="enable[a-zA-Z0-9_\]*"}<br>tunerList =<br>{nameString} ( xsd:token {pattern=","} {nameString} )*<br>localeContent =<br>attribute language {langCode} &<br>attribute prompt xsd:text &<br>attribute note xsd:text ?<br>langCode =<br>xsd:token = "en-US" | "fr-FR" | "de-DE" | "ja-JP" | "zh-CN" | "zh-TW" | "ko-KR" |<br>"nl-NL" | "sv-SE" | "it-IT" | "es-ES" | "pt-BR" | "nb-NO" | "fi-FI" | "da-DK" |<br>"cs-CZ" | "hu-HU" | "tr-TR" | "ru-RU" | "pl-PL" | "hr-HR" | "ro-RO" | "sk-SK" |<br>"sl-SI" | "uk-UA" | "ca-ES" | "eu-BS" | "ar-AE" | "el-GR" | "he-IL" |

Referring to the above example manifest schema, in some embodiments, the version attribute is the version of the schema itself, while the release attribute describes the required version of the software application (e.g., Adobe® Acrobat®) in order to interpret the schema (e.g., as the code for this example manifest schema is written in C++). The updateRate is used to override the time in days between checking for updates, while the updateWait is the delay time after initializing the software application (e.g., executing Adobe® Acrobat®). Once the manifest is checked, the rate of updates for SPA plug-ins will be set to that of the manifest until the described rate changes upon subsequent updates. An optional group can be specified to indicate the default group for all plug-ins listed in the manifest. With regard to a manifest plug-in element, standard identifying attributes of the plug-in include its unique id, group identifier, version, the configuration version it requires, and the release version of the software application required. In some cases, if the group identifier is specified is in the manifest element, it is not required for the plug-in element unless it used to override that group of the manifest. The release attribute represents the initial release for the update (e.g., subsequent releases may also be allowed but those will often have that plug-in version incorporated already or possibly a future version of the plug-in). In some cases, the configurations element is limited to one or more configuration elements, which can be specified with the platform (e.g., Microsoft® Windows® or Apple® OS X) and/or software application product (e.g., Adobe® Acrobat® Reader, Standard, or Pro) attributes defined. For example, the attributes can be combined using inclusive logic (e.g., the default in each case is to include everything, such that only specify the items needed to single out configurations; not specifying either platform or product will act to include all platforms or products, respectively). In some embodiments, enhanced logic is available along with logic operands (e.g., and, or, and negation).

In some embodiments, the tuner key attribute, such as shown in the above example manifest schema, uses an enable prefix to describe a key value pair which matches the software application registry entries regarding enterprise usage. If the tuner key is non-existent, the plug-in is not precluded; otherwise, the availability of the plug-in is dependent on the tuner key. For example, the tuner attribute enableWorkflows="AcrobatHS,ShareFile" would indicate to check entries of EnableAcrobatHS and EnableShareFile under the Workflows dictionary under the Adobe® Acrobat® registry area. The URI attribute specifies a valid location where the plug-in is located on a server. An appropriate hash algorithm and value can be required that correspond to the data at the URI. In some embodiments, a registry can include a disableXXX setting that is similar to an enableXXX setting except that in the absence of the registry key, the default behavior is to preclude the plug-in.

In some embodiments, there are several install attributes for on a per plug-in basis as well. These can include the requires prompt to override user settings (if auto install); if applicable, on which pane (if any) to display the prompt (promptPane); and whether an immediate install is desired (e.g., which may alter the UI instantaneously). In some cases, there is the capability to exclude downloads if the user has an ask preference for install (excludePromptInstall). The priority attribute can be used to describe the criticality for the update (e.g., to be used by the UI in suggesting an update to the user), such as required, recommended, optional, and testing.

In some embodiments, the variants element is used to optionally hold one or more variant elements, each of which describes that variant by its name and its percentage. The special variant name "disabled" is reserved to indicate the option of not loading the plug-in at all and may be used, but only with that predefined meaning. The sum of percentages should generally total no more than 100; any remaining percentage is treated as the option "inactive". In some embodiments, at runtime, the framework will select a choice based on the weighted options. For example, an AB test to be equal distributed among 10% of users would have variants of name="A", percentage="5" and name="B", percentage="5". In some embodiments, in the actual plug-in IDS (e.g., an ids.xml file), the useVariant attribute may be used to override this variant selection (e.g., the useVariant attribute can be used for overriding which variant had initially been selected at download time when reading from the SPA plug-ins manifest) to allow for minimal change to the SWF, such as in cases when a deadline for a periodic release is needed and/or in other use scenarios in which this functionality is desired. The SWF will be able to retrieve the variant using the new getVariant( ) API and individual UI items (e.g., anything that supports the flags, perms-, and enable-attributes) can use the variants attribute followed by a comma-separated list of variants as necessary. The variants can also be required to be listed at the top level of the plugin ids.xml file.

In some embodiments, the startDate and revertDate attributes are used to control the lifetime of a plug-in. The start date can indicate that a plugin should be downloaded immediately, but not loaded until a later start date. If not specified, the plug-in is to be installed at first opportunity. Another possible usage of the startDate is to ensure that all applicable users are ready when the testing is schedule to begin (e.g., to avoid a ramp-up period during which updates are occurring through a default update period). The revertDate can be used to ensure when a particular test should be concluded, such as for testing a new plug-in/new version of a plug-in using the variant mechanism as described herein with respect to various embodiments. Another possible usage for the revertDate attribute can be to immediately stop all usage of a plug-in, such as in the event of some security issue.

In some embodiments, the locales element includes one or more locale elements that contains a language attribute (e.g., which follows the RFC 3066 language code, such as lang="en-US"), as well as a localized prompt and optional note. The two reason fields (e.g., note and prompt) can be used for different situations. The prompt field can be used to display one or more reasons for updates when the user is prompted as to whether the updated is desired. For example, this prompt can be an HTML string that will be used as the main body text of a Flash popup. A note, however, is used in the case where SPA provides a notification that an automatic install has occurred. Due to its usage context, the note value string is generally not an HTML string.

Below is an example plug-in that includes variants. As shown below, this plug-in supports three variants (e.g., variant="A,B,C"). In this example, variant A is used for the top bar button, in the menus, and the advertisements. Variant B will only display in the advertisements. Variant C only appears in the top bar button.

```
<?xml version="1.0" encoding="utf-8"?>
<!--
-->
<!-- Defining Adobe's SPA EchoSign Plugin which is loaded in the EchoSign
Pane and not in the AddOns pane -->
<service id="com.adobe.acrobat.services.DEXEchoSign" group="com.adobe"
version="10.1.2" variant="A,B,C"
        name="DEX Share Plug-in"
xmlns="http://ns.adobe.com/pdf/services/2010"
enableLockdownSignService="SignPane">
    <!-- locale settings -->
    <locales src="locales.xml"/>
    <!-- resources (only icons) -->
    <resources src="resources.xml"/>
    <!-- URLs used by this plugin : Acrobat.com web service APIs version 2.0 -->
    <preferences>
       <!-- for EchoSign.com web services -->
       <policy allowDomain="https://*.echosign.com"/>
       <policy allowDomain="http://*.echosign.com"/>
       <!-- for Acrobat.com web services -->
       <policy allowDomain="https://*.acrobat.com"/>
       <policy allowDomain="http://*.acrobat.com"/>
       <policy allowDomain="https://*.acrocomcontent.com"/>
       <policy allowDomain="http://*.acrocomcontent.com"/>
       <!-- for all www.adobe.com links -->
       <policy allowDomain="https://*.adobe.com"/>
       <policy allowDomain="http://*.adobe.com"/>
    </preferences>
    <panels>
       <!-- the only flash panel in this plugin -->
       <flashPanel id="EchoSignPanel" title="Share" pane="BasicEchoSignPane"
swf="SWFs/EchoSign.swf"
                   persist="yes" events="yes" openAction="log-
echoSignButtonClick"/>
    </panels>
```

```xml
<!-- actions handled by this plugin -->
<actions>
    <!-- Simple actions which throw the browse dialog
    <action id="shareBrowse"          type="event" panel="SharePanel" name="DEXEvent" data="shareBrowse"/>
    <action id="attachBrowse"         type="event" panel="SharePanel" name="DEXEvent" data="attachBrowse"/>
    <action id="cpdfBrowse"           type="event" panel="SharePanel" name="DEXEvent" data="cpdfBrowse"/>
    <action id="shareAttachBrowse"    type="event" panel="SharePanel" name="DEXEvent" data="shareAttachBrowse"/>
    -->
    <!-- Simple actions which expand the corresponding panel -->
    <action id="spdfToolButton"       type="event" panel="EchoSignPanel" name="DEXEvent" data="spdfToolButton"/>
    <action id="spdfmenu"             type="event" panel="EchoSignPanel" name="DEXEvent" data="spdfSysTray"/>
    <action id="spdfGateway"          type="event" panel="EchoSignPanel" name="DEXEvent" data="spdfMenu"/>
    <action id="spdfSysTray"          type="event" panel="EchoSignPanel" name="DEXEvent" data="spdfSysTray"/>
    <action id="autoOpen"             type="event" panel="EchoSignPanel" name="DEXEvent" data="autoOpen"/>
        <action id="echoSignButton"   type="event" panel="EchoSignPanel" name="DEXEvent" data="echoSignButton"/>
    <!-- Logs actions which logs HL and call the appropriate next action -->
    <action id="log-spdfToolButton"   type="log" name="Toolbar_signPDF"           next="spdfToolButton"/>
    <action id="log-spdfMenu"         type="log" name="FileMenu_SignPDF"          next="spdfMenu"/>
    <action id="log-spdfGateway"      type="log" name="WelcomeScreen_SignPDF"     next="spdfGateway"/>
    <action id="log-spdfSysTray"      type="log" name="SysTray_SignPDF"           next="spdfSysTray"/>
    <action id="log-paneAutoOpen"     type="log" name="PreviousEchoSignPaneSession" next="autoOpen"/>
        <action id="log-echoSignButtonClick" type="log" name="EchoSignButton"    next="echoSignButton"/>
    <!-- Chained actions, open the share pane first and then the browse dialog
    <action id="showShareAndBrowse"        type="open" pane="BasicSharePane" next="shareBrowse"/>
    <action id="showAttachAndBrowse"       type="open" pane="BasicSharePane" next="attachBrowse"/>
    <action id="showCPDFAndBrowse"         type="open" pane="BasicSharePane" next="cpdfBrowse"/>
    <action id="showShareAttachAndBrowse"  type="open" pane="BasicSharePane" next="shareAttachBrowse"/>
        -->
    <!-- Chained actions, open the share pane first and then expand the corresponding panel -->
    <action id="showSPDFToolButton"   type="open" pane="BasicEchoSignPane" next="log-spdfToolButton"/>
    <action id="showSPDFMenu"         type="open" pane="BasicEchoSignPane" next="log-spdfMenu"/>
    <action id="showSPDFGateway"      type="open" pane="BasicEchoSignPane" next="log-spdfGateway"/>
    <action id="showSPDFSysTray"      type="open" pane="BasicEchoSignPane" next="log-spdfSysTray"/>
    <action id="paneAutoOpen"         type="open" pane="BasicEchoSignPane" next="log-paneAutoOpen" flags="B"/>
    <!-- Share Pane actions -->
    <action id="showSharePane"        type="open" pane="BasicSharsePane"/>
    <action id="hideSharePane"        type="open"/>
</actions>
<!-- Toolbar items defined by this plugin -->
<buttons>
    <button id="SignPDF" tooltip="avTooltipToolbarItemSPDF" icon="SPDFIcon_Md" rollover="SPDFIcon_Md_R" action="showSPDFToolButton" position="end" label="avCaptionToolbarItemSPDF" contextIcon="SPDFIcon_Sm" locales="en-US" variant="A,C"/>
</buttons>
<menus>
    <!-- Menu items for EchoSign.com -->
    <menuSeparator reference="Email" position="after" locales="en-US" variant="A"/>
    <menuItem label="avCaptionMenuItemSPDF" action="showSPDFMenu" icon="SPDFIcon_Sm" locales="en-US" variant="A"/>
</menus>
```

```
<!-- Advertisement items (to be shown in the gateway) -->
<advertisements>
    <advertisement id="SignPDFGT"   label="avLabelGTSignPDF"
icon="SPDFIcon_X1"   action="showSPDFGateway"   locales="en-US"
variant="A,B"/>
</advertisements>
</service>
```

The following table gives some examples of how targeted information (e.g., using manifest 114 and/or target information 118) may be used to target certain users, but target information is not limited to the examples described below. Any target information which can be used to discern a unique segment of users (e.g., paying customers versus free customers, those from a given state with certain laws, those who have customer feedback turned on, etc.) may be used.

TABLE 1

Examples of Target Information

| Example Target Information | Examples |
| --- | --- |
| Platform | Microsoft Windows, Apple Mac OS, Android |
| Product | Adobe Acrobat Reader, Adobe Acrobat Standard, Adobe Acrobat Pro |
| Enterprise Users | Identifies enterprise users and, if so, the particular company the enterprise user is associated with. If a user is an enterprise user, a company or enterprise which a user is a member of, and/or rules associated with that company or enterprise may be obtained by checking a restricted registry area associated with the application (e.g., a restricted registry managed by Adobe Acrobat). In some embodiments, an enterprise customer sets a registry entry for all its users (which normal customers would not have set). The plug-ins then make use of that entry to behave in some different fashion when the plug-in sees that registry entry set. MacOS also supports this via a special property list file. Other platforms use other mechanisms as program resources. |
| Start Date | Indicates earliest permitted start date of a plug-in. The plug-in may be downloaded prior to the start date, but not installed until the specified start date. If not specified, the plug-in is installed at the first opportunity. |
| Revert Date | Indicates end date of a plug-in (e.g., may be used to specify an end date to test out a variety of messages). |
| Language | Language of the message (and therefore the language of users for which the message is relevant). |
| Variant Name(s) and Percentage(s) | Used to randomly determine whether to display a message using a messaging plug-in. An example is described in further detail below. |

In some embodiments, the target information is compared against local configuration information (e.g., basic attributes and/or advanced attributes) to determine if the plug-in should be downloaded and/or installed/loaded. For example, local configuration information can be obtained from a variety of sources and/or a variety of locations. In some embodiments, a registry area (e.g., some of which may be restricted) associated with an application (e.g., Adobe® Acrobat®) is accessed and location configuration information is obtained from there (e.g., such as tuner key settings/values).

Figure 4:
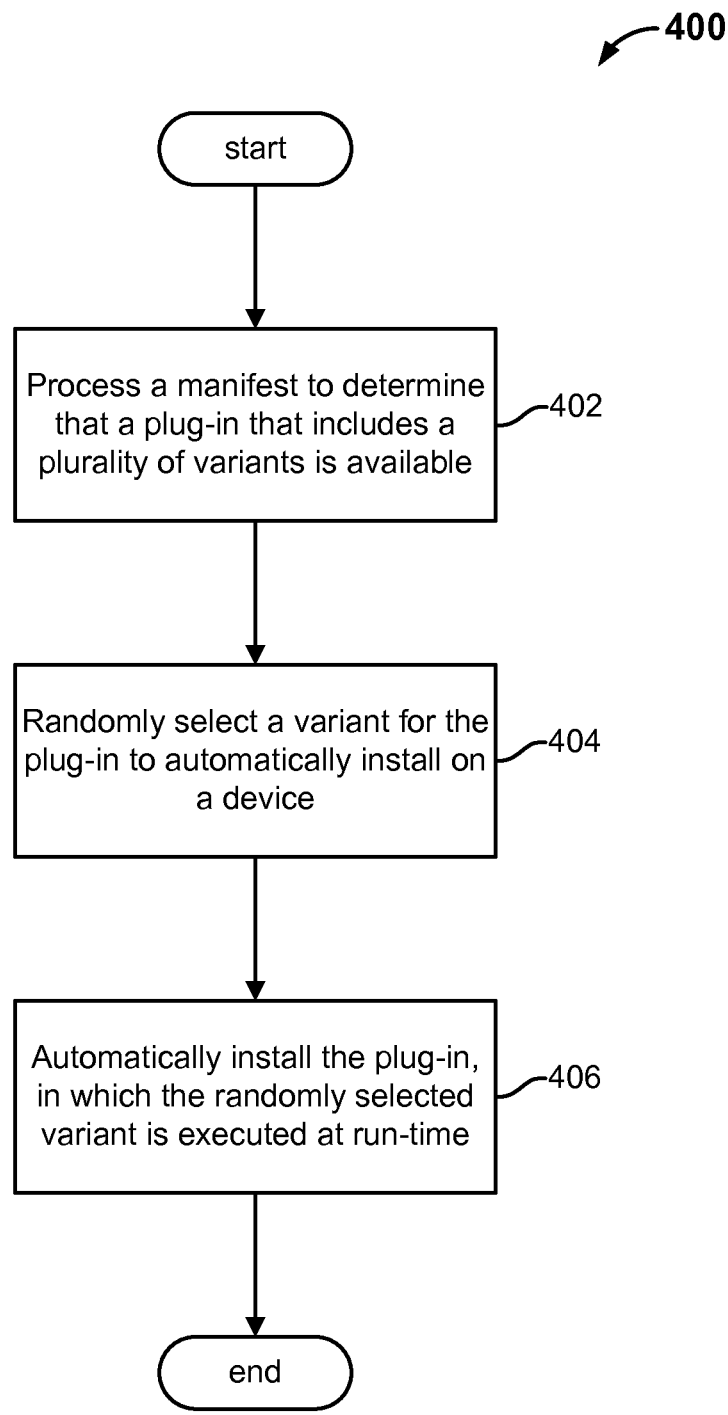
FIG. 4 is a flow diagram of a process for interactive product improvement through the use of variants and data gathering reports in a system that can be updated on the fly in accordance with some embodiments.

FIG. 4 is a flow diagram of a process for interactive product improvement through the use of variants and data gathering reports in a system that can be updated on the fly in accordance with some embodiments. At 402, processing a manifest is performed to determine that a plug-in that includes a plurality of variants is available. At 404, randomly selecting a variant for the plug-in to automatically install on a device is performed (e.g., the variant selection can be stored as a configuration parameter for the plug-in, such as a value stored in a registry key). At 406, automatically installing the plug-in is performed, in which the randomly selected variant is executed at run-time (e.g., at load time of the plug-in, the stored variant selection can be used to select the variant portion of plug-in to execute).

Figure 5:
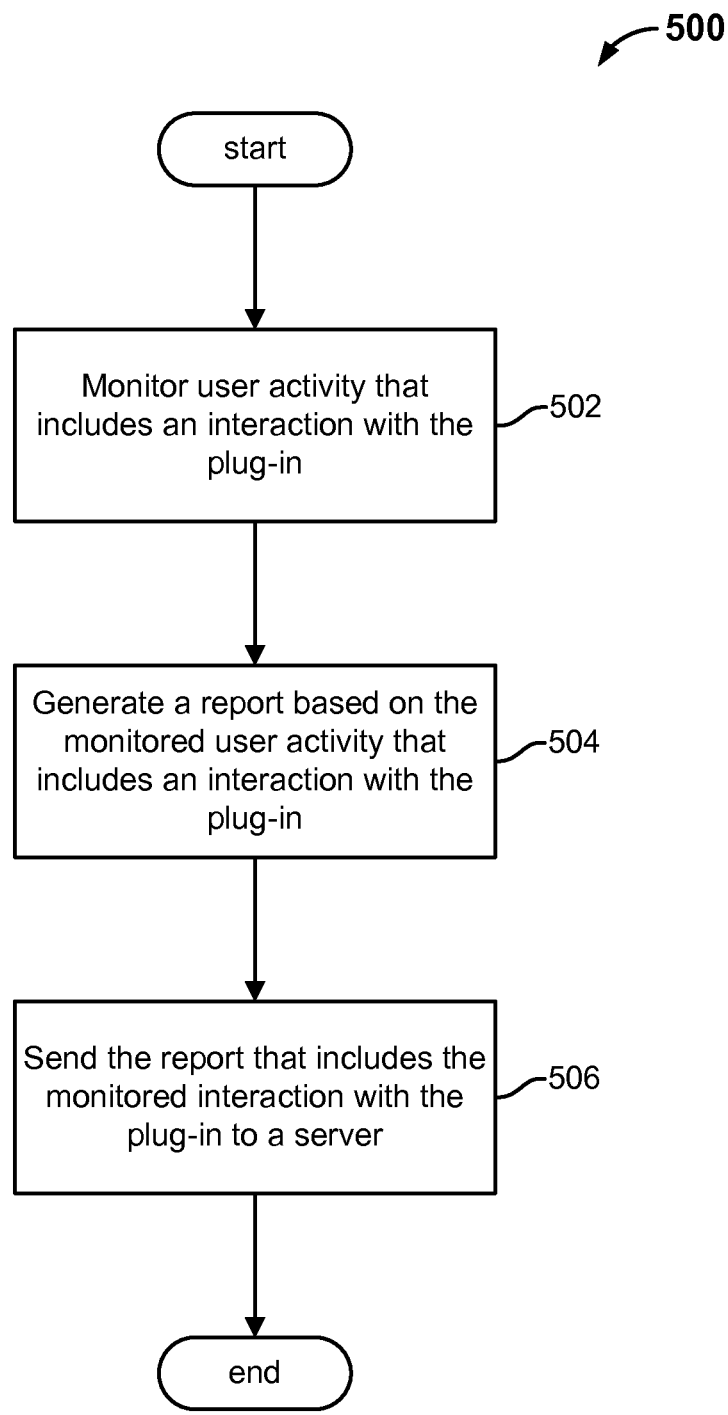
FIG. 5 is another flow diagram of a process for interactive product improvement through the use of variants and data gathering reports in a system that can be updated on the fly in accordance with some embodiments.

FIG. 5 is another flow diagram of a process for interactive product improvement through the use of variants and data gathering reports in a system that can be updated on the fly in accordance with some embodiments. At 502, monitoring user activity that includes an interaction with a plug-in is performed. At 504, generating a report based on the monitored user activity that includes an interaction with the plug-in is performed. At 506, sending the report that includes the monitored interaction with the plug-in to a server is performed.

Figure 6:
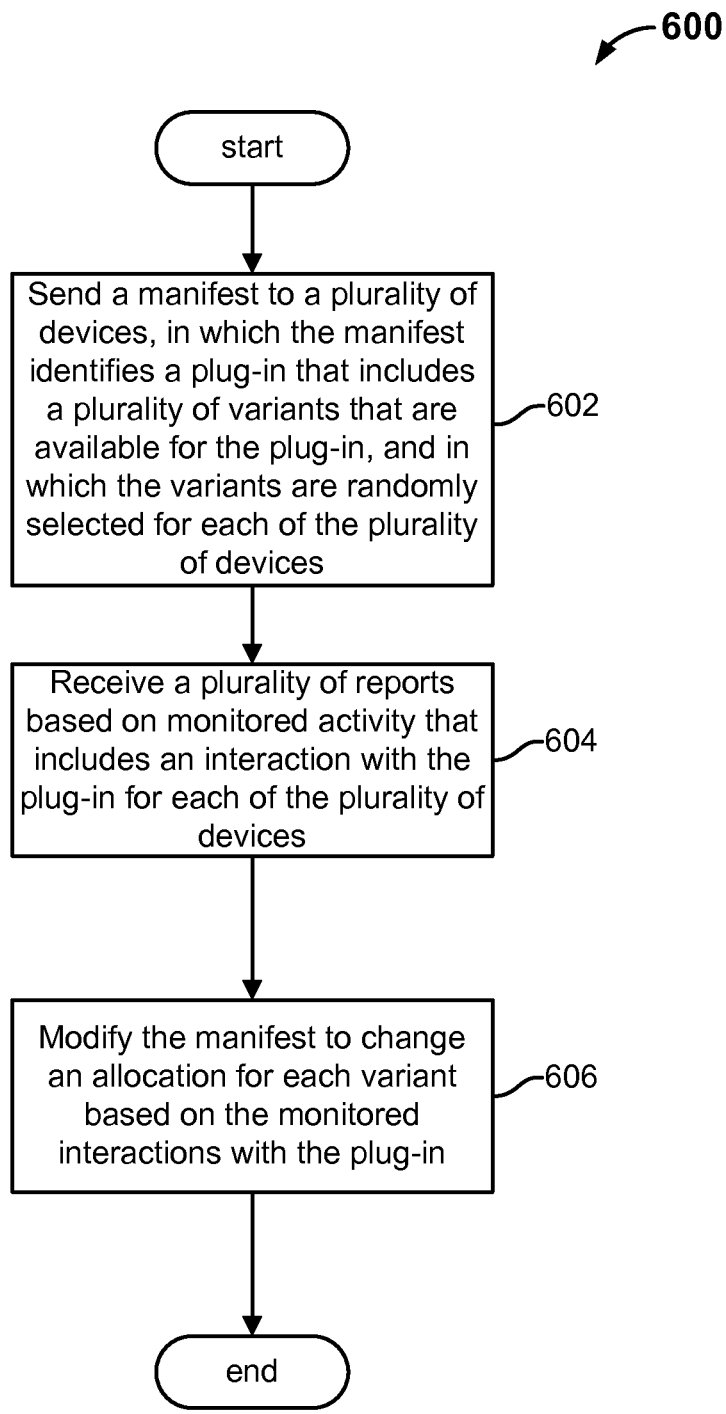
FIG. 6 is another flow diagram of a process for interactive product improvement through the use of variants and data gathering reports in a system that can be updated on the fly in accordance with some embodiments.

FIG. 6 is another flow diagram of a process for interactive product improvement through the use of variants and data gathering reports in a system that can be updated on the fly in accordance with some embodiments. At 602, sending a manifest to a plurality of devices is performed, in which the manifest identifies a plug-in that includes a plurality of variants that are available for the plug-in, and in which the variants are randomly selected for each of the plurality of devices (e.g., the variant selection can be stored as a configuration parameter for the plug-in, such as a value stored in a registry key on each of the devices). At 604, receiving a plurality of reports based on monitored activity that includes an interaction with the plug-in for each of the plurality of devices is performed. At 606, modifying the manifest to change an allocation for each variant based on the monitored interactions with the plug-in is performed. In some embodiments, an automatic algorithm can be performed to determine new parameters for an updated manifest, and automatically updating the manifest (e.g., generate the updated manifest on the server for distribution to client devices, such as for providing an automated, complete turn-key system). For example, if any candidate receives a plurality of votes and the number of votes exceeds a minimum sample number and a minimum number of days has passed, then update the manifest to utilize the winning variant.

In some embodiments, the new parameters for an updated manifest are configured on a server copy of the manifest such that clients can be configured to select, in some cases, a different variant of a previously downloaded and installed plug-in (e.g., using this approach, the plug-in need not be re-downloaded, rather, the new manifest just needs to be downloaded and processed by the client device, which may result in a new variant selection associated with the previously downloaded and installed plug-in, such that the stored variant selection parameter can be updated accordingly, and at run-time, the variant of the plug-in is selected based on the possibly updated variant selection parameter). In some cases, a new version of the plug-in that includes variants can be provided, in which the variant selection parameter(s) on the clients are not modified or updated (e.g., this can provide a control test group, in which the same users are grouped or associated as in a prior round of testing of the previous version of the plug-in).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  a processor;
  instructions stored on a non-transitory computer readable medium that when executed by the processor perform operations comprising:
    determining that a plug-in that includes a plurality of variants is available;
    selecting a plug-in variant for a device based on allocation percentages included in a manifest, wherein the manifest includes allocation percentages corresponding to percentages of devices that will receive each of the plurality of plug-in variants; and
    automatically installing the selected plug-in variant on the device, wherein the randomly selected plug-in variant is executed at run-time.

2. The system recited in claim 1, wherein the selected variant facilitates a feedback loop for providing interactive product improvement.

3. The system recited in claim 1, wherein the manifest is modified to change the allocation percentage for the plug-in variant based on monitored user interactions with the plug-in variant.

4. The system recited in claim 1, wherein the manifest is modified to identify a default variant of the plurality of plug-in variants, wherein the default variant is executed at run-time.

5. The system recited in claim 1, wherein the selected plug-in variant requires a license to execute.

6. The system recited in claim 1, wherein the selected plug-in variant requires a license to execute, and wherein additional payment is required to access the selected plug-in variant.

7. The system recited in claim 1, wherein the processor is further configured to:
  monitor user activity that includes an interaction with the selected plug-in variant.

8. The system recited in claim 1, wherein the processor is further configured to:
  generate a report based on monitored user activity that includes an interaction with the selected plug-in variant.

9. The system recited in claim 1, wherein the processor is further configured to:
  monitor user activity that includes an interaction with the selected plug-in variant; and
  generate a report based on the monitored user activity that includes an interaction with the selected plug-in variant.

10. The system recited in claim 1, wherein the processor is further configured to:
  provide a report based on monitored user activity that includes an interaction with the selected plug-in variant.

11. A method, comprising:
  identifying a plurality of plug-in variants using a manifest, the manifest including a plurality of plug-in variant identifiers and a plurality of allocation percentages for each of the plurality of plug-in variant identifiers;
  selecting a plug-in variant of the plurality of plug-in variants to install on a device based on the plurality of allocation percentages; and
  installing the selected plug-in variant, wherein the selected plug-in variant is executed at run-time.

12. The method recited in claim 11, wherein the selected plug-in variant facilitates a feedback loop for providing interactive product improvement.

13. The method of claim 11, further comprising:
  monitoring user activity that includes an interaction with the selected plug-in variant;
  generating a report based on the monitored user activity that includes an interaction with the selected plug-in variant; and
  providing the report that includes the monitored interaction with the selected plug-in variant.

14. The system recited in claim 11, wherein selecting the plug-in variant of the plurality of plug-in variants is further based on an identifier shared between a plurality of users.

15. The system recited in claim 11, wherein selecting the plug-in variant of the plurality of plug-in variants is further based on a start date and revert date associated with at least one of the plurality of plug-in variants.

16. A non-transitory computer program product, the computer program product being embodied in a tangible computer readable storage medium and comprising computer instructions for:
  identifying a plurality of plug-in variants using a manifest, the manifest including a plurality of plug-in variant identifiers and a plurality of allocation percentages for each of the plurality of plug-in variant identifiers;
  selecting a plug-in variant of the plurality of plug-in variants to install on a device based on the plurality of allocation percentages; and
  installing the selected plug-in variant, wherein the selected plug-in variant is executed at run-time.

17. The non-transitory computer program product recited in claim 16, wherein the selected plug-in variant facilitates a feedback loop for providing interactive product improvement.

18. The non-transitory computer program product recited in claim 16, further comprising computer instructions for:
  monitoring user activity that includes an interaction with the selected plug-in variant;
  generating a report based on the monitored user activity; and
  providing the report to a user.

19. A system, comprising:
  a processor configured to:
    send a manifest to a device of devices, wherein the manifest includes a plurality of plug-in variant identifiers and a plurality of allocation percentages for each of the plurality of plug-in variant identifiers, and wherein a plug-in variant is randomly selected for the device; and
    receive a report based on a monitored interaction between the device and the plug-in variant; and
  a memory coupled to the processor and configured to provide the processor with instructions.

20. The system recited in claim 19, wherein the processor is further configured to:
  modify the manifest to change an allocation percentage of the plurality of allocation percentages for each plug-in variant based on the monitored interaction with the plug-in.

21. The system recited in claim 19, wherein the processor is further configured to:

modify the manifest to identify one of the plurality of plug-in variants as a default variant for the plug-in, wherein the default variant is executed at run-time.

\* \* \* \* \*